United States Patent [19]

Burnham

[11] Patent Number: 5,853,590
[45] Date of Patent: Dec. 29, 1998

[54] METHOD FOR TREATING BIOORGANIC AND WASTEWATER SLUDGES

[75] Inventor: Jeffrey C. Burnham, Naples, Fla.

[73] Assignee: Medical College of Ohio, Toledo, Ohio

[21] Appl. No.: 922,847

[22] Filed: Sep. 3, 1997

Related U.S. Application Data

[63] Continuation of Ser. No. 520,959, Aug. 30, 1995, abandoned.

[51] Int. Cl.$^6$ ..................................................... C07F 11/16
[52] U.S. Cl. ..................................... 210/609; 71/9; 71/13; 210/631; 210/764; 210/771; 210/916; 465/128
[58] Field of Search ............................... 71/9, 12, 13, 21, 71/22, 63; 210/609, 613, 631, 710, 713, 752, 764, 766, 767, 916, 771; 405/128, 129

[56] References Cited

U.S. PATENT DOCUMENTS

| | | | |
|---|---|---|---|
| 4,781,842 | 11/1988 | Nicholson | 210/751 |
| 4,902,431 | 2/1990 | Nicholson et al. | 210/751 |
| 5,013,458 | 5/1991 | Christy et al. | 210/751 |
| 5,135,664 | 8/1992 | Burnham | 210/751 |
| 5,275,733 | 1/1994 | Burnham | 210/609 |
| 5,417,861 | 5/1995 | Burnham | 210/609 |
| 5,422,015 | 6/1995 | Angell et al. | 210/751 |
| 5,435,923 | 7/1995 | Girovich | 210/609 |
| 5,554,279 | 9/1996 | Christy | 210/149 |

*Primary Examiner*—Peter A. Hruskoci
*Attorney, Agent, or Firm*—Barnes, Kisselle, Raisch, Choate, Whittemore & Hulbert

[57] ABSTRACT

A method of treating sludge to provide a stable product for use as a beneficial soil or fertilize for agricultural lands is disclosed which includes the steps of:

(a) mixing sludge with at least one alkaline material in an amount sufficient to raise pH of the mixture to a level of at least 12 and to increase percent of solids in the mixture to at least 40% by weight, and such that odorant sludge organics and inorganics are bound to adsorbent particles of the alkaline material, (b) aerating and drying the mixture by agitation and heating to stabilize the mixture and increase the percent solids to at least 50% by weight, and (c) pasteurizing the dried mixture at a temperature at or above 52° C. by application of heat resulting from an exothermic reaction of the alkaline material with water in the sludge, wherein said step (b) is carried out in a mechanical means selected from the group from the group consisting of a drum dryer, a pelletizer, and a fluidized bed apparatus, and wherein the heat applied for drying in said step (b) reduces the amount of additional heat required for pasteurization in said step (c) thereby reducing the amount of alkaline material needed for said exothermic reaction.

10 Claims, 3 Drawing Sheets

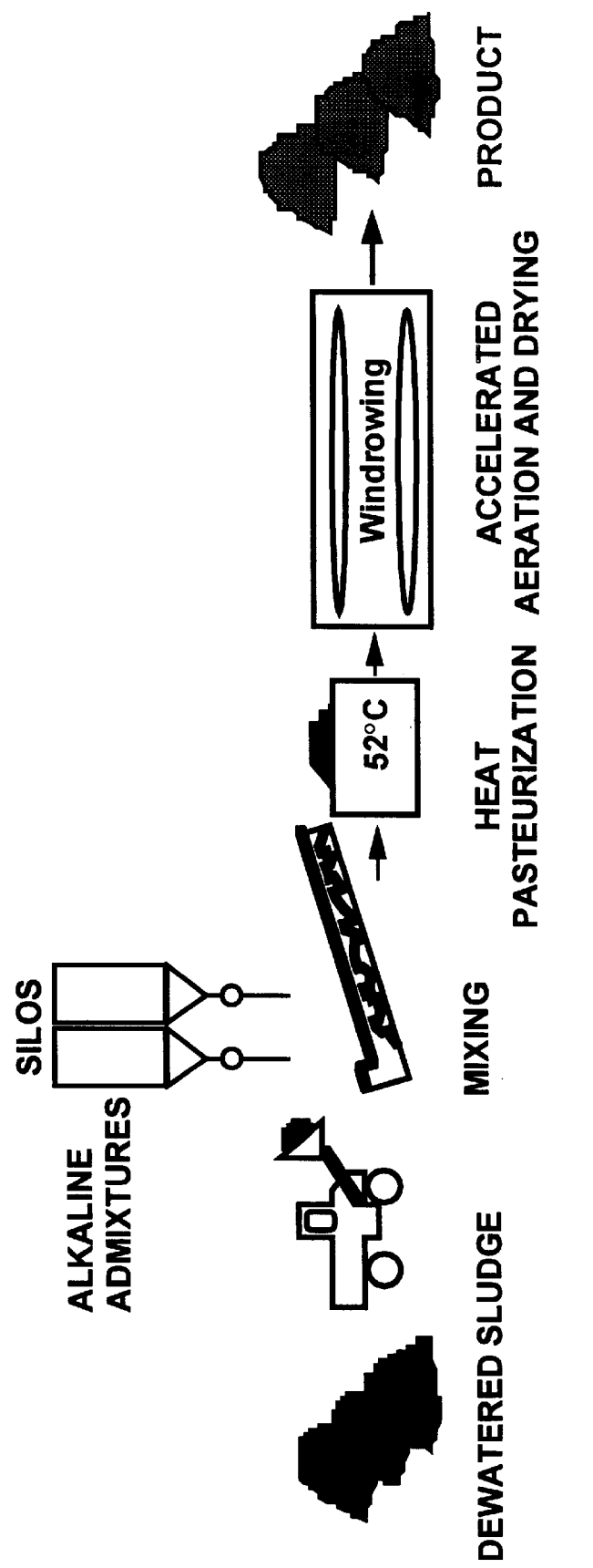

METHOD FOR TREATING BIOORGANIC AND WASTEWATER SLUDGES

This application is a continuation of application Ser. No. 08/520,959 Filed Aug. 30, 1995 now abandoned.

This invention relates to a method of treating bioorganic and/or wastewater sludge that is designed to microbially decontaminate and stabilize the sludge so that it can be safely utilized as a soil amendment or fertilizer in agriculture or as a component of synthetic soil for general usage.

DEFINITIONS

1. Process to Significantly Reduce Pathogens (PSRP) (Established CFR257, Sept. 13, 1979)

PSRP is the minimum disinfection and stabilization requirement of U.S. Environmental Protection Agency. Processes so classified, i.e., aerobic digestion, anaerobic digestion, lime stabilization (pH>12 for two hours), produce sludges which may be land filled or land applied on non-food chain crops with stringent public access restrictions and grazing restrictions. Such processes must demonstrate ability to reduce pathogen concentrations by 90%. As set forth in the specification of the US Pat. No. 4,902,431, in a Nov. 6, 1985 memorandum, the EPA indicated that to qualify a process as a PSRP one must demonstrate that the process reduces animal viruses by one log and pathogenic bacterial densities by at least two logs and must reduce the vector attractiveness such that vectors, like flies or rats, are not attracted to the sludge.

More recently, the USEPA has adopted a Class B regulation to replace the PSRP. Although the impact of the Class B regulations is to achieve a similar microbial content as specified in the above paragraph there are three alternatives requirements for demonstrating the achievement of this pathogen reduction, but basically, the fecal coliform density in the treated sludge must be 2 million colony forming units per gram total solids sewage sludge on a dry weight basis. The alternatives for reaching this standard are defined by reference to the USEPA publication EPA/625/R-92/013 which was published in December of 1992 and formed the basis of the Class B pathogen reduction rules of the 40CFR part 503 rules which were promulgated by the USEPA in early 1993.

2. Process to Further Reduce Pathogens (PFRP) (Established 40CFR257, Sept. 13, 1979)

PFRP is the most stringent criteria established by U.S. EPA for disinfection and stabilization of sewage sludges. Processes so classified must demonstrate the ability to reduce pathogen concentrations below detectable levels. Processes directly identified in 40 CFR 257 were compost, heat drying (>80C.+moisture content below 10%), and heat treatment (>180C. for 30 minutes). Also with "add-on" processes to PSRP processing such as high heat pasteurization, the sludge must be maintained for at least 30 minutes at a minimum temperature of 70C. in order to be deemed as Processes to Further Reduce Pathogens in 40 CFR 257.

At the time of publication of 40 CFR 257, no criteria were established for PFRP processes.

As indicated in US Pat. No. 4,902,431, on Nov. 6, 1985, the EPA issued a memorandum indication that to qualify a process as PFRP one must demonstrate reduction of pathogenic bacteria, animal viruses, and parasites "below detectable limits" of one (1) plaque forming unit (PFU) per 100 ml of sludge for animal viruses; three (3) colony forming units (CFU) per 200 ml of sludge for pathogenic bacterial (Salmonella sp.); and one (1) viable egg per 100 ml of sludge for parasites (Ascaris sp.). Vector attractiveness must also be reduced for PFRP. NOTE: PFRP regulations do not require the survival of any non-pathogenic organisms. In fact, many PFRP processes result in sterilization, i.e., the destruction of all microorganisms.

More recently, the USEPA has adopted a Class A regulation to replace the PFRP. Although the impact of the Class A regulations is to achieve the same microbial content as specified in the above paragraph there are a variety of alternatives requirements for demonstrating the achievement of this pathogen reduction. These are defined by reference to the USEPA publication EPA/625/R-92/013 which was published in December of 1992 and formed the basis of the Class A pathogen reduction rules of the 40CFR part 503 rules which were promulgated by the USEPA in early 1993.

3. Land Application

Land application is the traditional method of sludge utilization. PSRP sludges are a minimum requirement, but may only be used on secure fields with substantial restrictions. Public access is prohibited with PSRP sludges. PFRP has no restrictions.

4. Disinfection

Disinfection is the destruction of pathogens, i.e., disease causing microorganisms, to some quantitative level.

5. Stabilization

Used in two ways:
a. The ability of a process to maintain levels of disinfection by preventing pathogen regrowth.
b. The ability of a process to reduce odors and to prevent odor redevelopment.

6. Sterilization

Sterilization is the complete destruction of all microorganisms in a substance.

7. Pasteurization—Conventional definition

Pasteurization is the destruction of all pathogenic microorganisms except bacterial spores.

8. Adsorptive Material

Adsorptive material is a material capable of binding organic and inorganic substances to its surface.

9. USEPA

United States Environmental Protection Agency.

10. Wastewater sludge

A sludge comprised of the solids portion of the output of a wastewater treatment plant that normally is comprised of microorganisms, organics and inorganic precipitates that are separated from the water effluent discharge from the plant. This sludge is often unprocessed beyond a concentration process and is termed a raw sludge. Other sludges from a wastewater plant have been processed and are considered digested sludges or secondary or waste-activated sludges or combined sludges.

11. Bioorganic sludge

An organic sludge comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products, sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms.

11. Organic sludge

A sludge derived from industrial products and byproducts that are comprised in the majority microbially degradable organic materials not of biological or microbiological origin. This definition would include sludges comprised of recycled organic products such as recycled paper and paper products.

BACKGROUND OF THE INVENTION

The United States Environmental Protection Agency (EPA) has promulgated rules governing the type of processes that an be used to treat wastewater sludge.

Under 40 CFR 257, a Process to Further Reduce Pathogens (PFRP) must be used where sewage sludge or septic tank pumping are to be applied to a land surface or are incorporated into the soil, and crops for direct human consumption are to be grown on such land within eighteen (18) months subsequent to application or incorporation.

In U.S. Pat. Nos. 4,781,842 and 4,902,431 there are disclosed PFRP processes wherein:

wastewater sludge containing odor, animal viruses, pathogenic bacteria, and parasites is treated to provide a fertilizer for agricultural lands which can be applied directly to the lands which consists essentially of the following steps: mixing said sludge with at least one alkaline material, wherein the amount of added material mixed with said sludge being sufficient to raise the pH of said mixture to 12 and above for at least one day;

and drying said mixture to produce a granular material, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacterial therein no less than three colony forming units per 100 ml of said sludge; to reduce parasites therein to less than one viable egg per 100 ml of said sludge; to reduce vector attraction to said sludge; and to prevent significant regrowth of the pathogenic microorganisms.

In these processes, the alkaline material may comprise lime, cement kiln dust or lime kiln dust or other alkaline materials. Subsequently in U.S. Pat. No. 5,275,733 these material were expanded to include cement kiln dust, lime kiln dust, gypsum, fluidized bed ash, lime injected multistage burner ash, dry sulfur scrubbing residue, slag fines, pulverized calcium carbonate, Class C or Class F fly ash, or a combination thereof. Other processes for treating wastewater sludge have utilized the concept of raising the pH in combination with high heat, e.g., greater than 70C., to nearly sterilize as contrasted to pasteurizing the sludge thereby killing nearly all of the bacteria both undesirable and desirable. With these "add-on" processes usually the principal surviving microorganisms are bacterial spores. Such microbially restricted sludges lose the significant fertility value associated with bioactivity. One of the principal purposes of the present invention is to avoid excess killing of this microflora as the stabilizing value of these organisms has been recognized in U.S. Pat. No. 5,275,733 and U.S. Pat. No. 5,417,861.

The process of U.S. Pat. Nos. 4,781,842; 4,902,431 requires a drying period which is usually effected by a windrowing process and results in a product that is above pH 12 and, if produced from an anaerobically digested sludge, emits significant amounts of ammonia. The processes substantially reduce the emission of ammonia by aeration (such as windrowing) but to do so the processes are taking 3 to 10 days to prepare the product for storage or market. Other alkaline treatment processes, such as in U.S. Pat. No. 5,013,458, using high amounts of CaO and heat above 70C. for 30 minutes have been approved by the USEPA as PFRP and have been utilized as the basis for constructing a formula predicting pasteurization based upon time of incubation at a certain temperature and published as part of 40CFR 257 part 503.

When alkaline materials are added to municipal sludges in sufficient mass to raise the pH to at least 11 and to over 12, toxic stresses occur that may affect the disposition of the treated sludge material (EPA 600/2-78-171). For example, the high pH itself may preclude the product use in certain agricultural settings; in addition, the high pH triggers the release of volatile ammonia which itself is toxic and, of course, represents the loss of valuable nitrogen from the potential agricultural product.

In U.S. Pat. Nos. 4,781,842 and 4,902,431 Nicholson and Burnham teach the significant advantages of adding accelerated drying by aeration to alkaline treated sludges to achieve odor reduction and control. When windrows are used, this Nicholson and Burnham process commonly takes between 3 and 10 days to effect the aeration/drying. The more recent U.S. Pat. Nos. 5,275,733 and 5,417,861 provide a faster method of accomplishing same. These patents recognize that an ecologically active population of microflora is critically significant to long-term sludge stability because of its ability: a) to enhance by its own metabolism the carbonation of any residual hydroxides or likewise the catabolism of unstable organics; b) to reduce sludge odors and produce a soil-like odor; and c) to prevent the regrowth of pathogenic microorganisms.

Another type of sludge that presently is causing a variety of problems to society with regard to proper disposal or use is a broad group of bioorganic sludges. These substances include organic sludges comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products; sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms. Another sludge material to be stabilized as per the treatment described in the present invention may include sludges organic sludges which are derived from industrial products and byproducts that are comprised in the majority by microbially degradable organic materials not of biological or microbiological origin. Theses organic sludges might include recycled organic products such as recycled paper and paper products. The treatment of these sludges by the process of this invention is significant for two reasons: one, these bioorganic sludges will usually provide an excellent substrate for anaerobic bacterial metabolism resulting in the creation of noxious odors and community problems, and two, these sludges without stabilization will create runoff problems with non-point source discharge pollution. This stabilization will delay entry of the nitrogen into the ground water both avoiding contamination and allowing longer access for crops to the nitrogen in the stabilized sludge product resulting from this invention.

Among the objectives of the present inventions are to provide a method of treating and stabilizing bioorganic or organic sludges and/or wastewater sludges in such a processing sequence as to carefully regulate the pathogen control mechanisms incorporated while minimizing the heat and ammonia stresses to the indigenous surviving microflora in order to provide a beneficiated soil or fertilizer.

SUMMARY OF THE INVENTION

The present invention provides a process to create stable products from municipal or bioorganic sludges by modifying the sequence of sludge processing such that the indigenous non-pathogenic microbial communities that are resident in a processed sludge product be protected as much as possible. In accordance with the present invention a heating step which is a major part of the pasteurization process of the sludge mixture is provided for after the drying step in the sludge processing sequence. This heating step, is conducted at specific temperatures. The heating step improves the processes established in U.S. Pat. Nos. 4,781,842 and 4,902,431 by placing a mechanical dryer in the process stream immediately following the initial mixing of the organic or municipal wastewater sludge with a stabilizing alkaline material and immediately prior to the heat pulse pasteurization step of the process.

In accordance with the invention, the process comprises the steps of treating and stabilizing a dewatered unprocessed sludge, i.e., raw wastewater sludge, or bioorganic or organic sludges or further treating wastewater sludges after they have been dewatered so that they achieve the US Environmental Protection Agency's PFRP standard for pathogen reduction, by mixing the sludge with an adsorbent alkaline material to effect odor reduction, accelerate the achievement of granularity, and consequently adjusting the pH of the sludge mixture to above pH 12.0, and aerating and drying the sludge mixture by mechanical means as in a drum dryer, pelletizer or fluidized bed apparatus, and then subjecting the sludge mixture to a heat of 52C. or above for a time dependent upon the temperature achieved, i.e., the higher temperatures, e.g., 70C. would need to be held for 30 minutes, while the lower temperatures, 52C. would be held for 12 hours. The exact time for determining the length of this heat pasteurization step is taught by the formula present in the 40CFR part 503 regulation of 1993, incorporated herein by reference.

An important aspect of the present invention is that it places a mechanical dryer, through which the sludge mixture passes in the process stream immediately following the initial blending of the sludge with the alkaline admixture, before it enters the heat pasteurization step in the sludge processing. The present invention recognizes that the prior patents, U.S. Pat. Nos. 4,781,842 and 4,902,431, may employ a mechanical dryer to substitute for the aeration and drying windrow process, but that they employ such a device only after completion of the heat pasteurization step.

BRIEF DESCRIPTION OF THE DRAWINGS

FIG. 3 is a schematic which shows the sequence of steps as provided in U.S. Pat. No. 4,902,431 using the common aerated windrow procedure which is an alkaline stabilization process with the heat pasteurization step occurring prior to the aeration and drying step.

DETAILED DESCRIPTION OF THE PREFERRED EMBODIMENT

Figure 1:
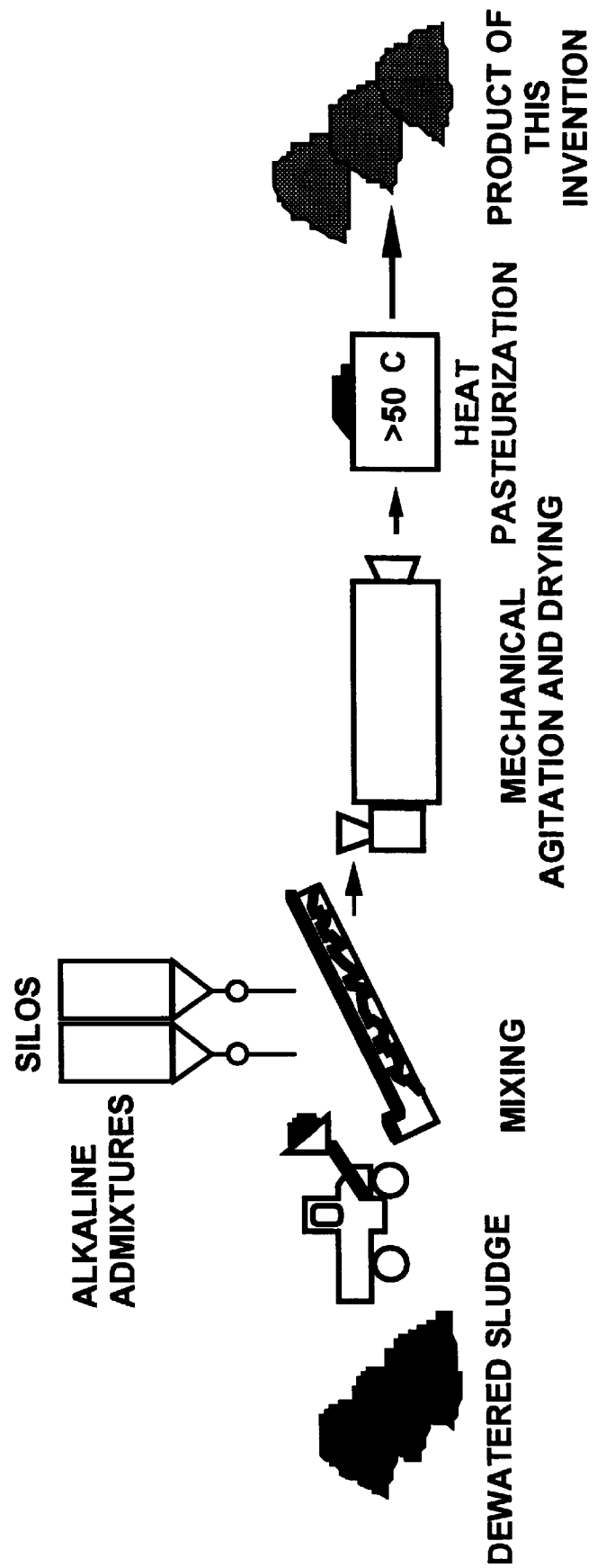
FIG. 1 shows an overall schematic for the process in accordance the the present invention described herein.
Figure 2:
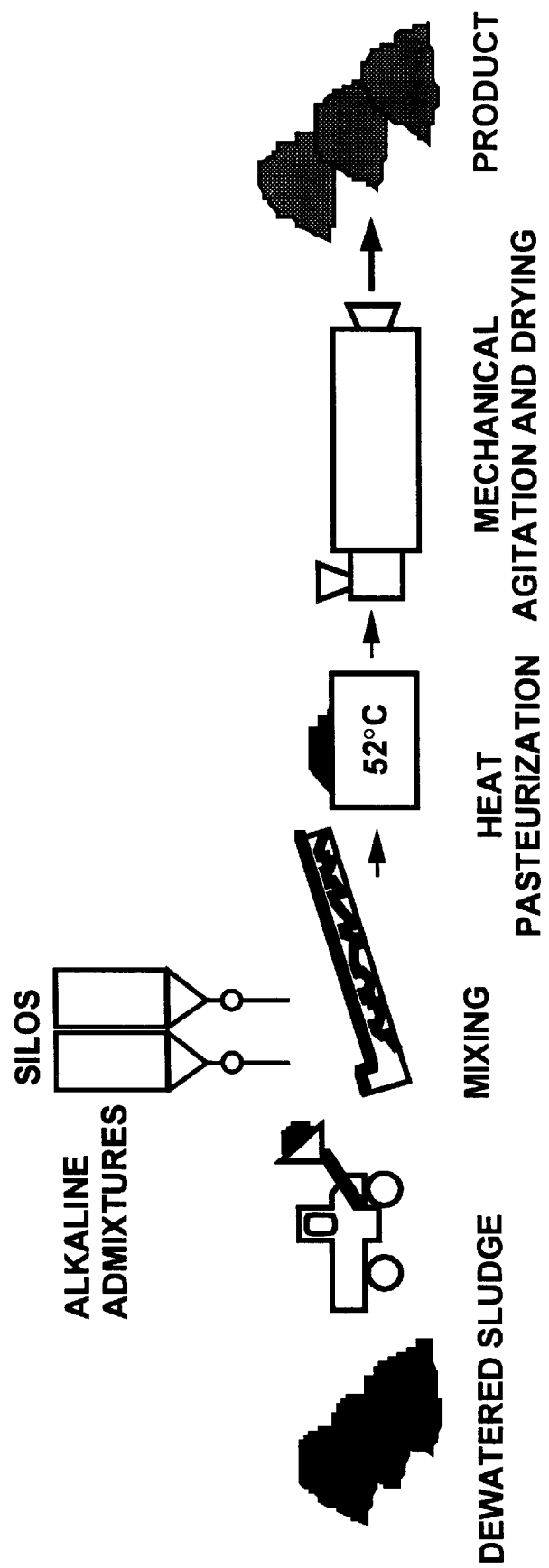
FIG. 2 is a schematic which shows the sequence of steps as provided in U.S. Pat. No. 4,902,431 with a mechanical dryer replacing the more traditional aerated windrow. This sequence is a prior alkaline stabilization process with the heat pasteurization step occurring prior to the agitation and drying step.

This invention relates to a method of treating bioorganic or organic sludge and/or wastewater sludge designed to detoxify, stabilize and beneficiate the sludge so that it can be safely used as a soil or applied as a fertilizer in agriculture.

In accordance with the present invention, the method comprises:

a) a method to treat sludge to provide a stable product for use as a beneficial soil or fertilizer for agricultural lands or as a synthetic soil component;

b) treating the sludge with a highly adsorbent alkaline material such that the pH is adjusted to a level which will severely inhibit the microorganisms present, preferably over pH 12.0, and the solids of the mixture are raised to over 40% and;

c) the sludge mixture is then processed through a dryer which raises the percent solids to above 50% in the mixture, and;

d) the mixture is then processed in a heat step to complete the pasteurization of the sludge mixture.

The present invention stabilizes sludges after they have been dewatered so that they can achieve the U.S. Environmental Protection Agency's PFRP standard for pathogen reduction. The sludges may be comprised of raw, digested, secondary or combined wastewater sludges, or bioorganic or organic sludges, or a mixture of such sludges. The method comprises: a) mixing the sludge with an amount of an adsorbent alkaline material to effect odor reduction, to improve the heat transfer efficiency of the sludge mixture drying process, to accelerate the achievement of granularity, and consequently adjusting the pH of the sludge mixture to above pH 12.0, and raising the percent solids of the mixture to over 40%, and b) then by mechanically agitating and drying the sludge mixture as in a drum dryer, pelletizer or fluidized bed apparatus, and c) then subjecting the sludge mixture to a heat of 52C. or above for a time dependent upon the temperature achieved in the heat. As disclosed in above-referenced U.S. Pat. No. 4,902,431, this heat pasteurization step may be accomplished by means of the exothermic creation that releases the chemical energy contained in the alkaline material, either alone or supplemented by heat generated by other means. The the higher temperatures achieved in the heat the shorter time the sludge mixture need be incubated in the heat pulse, eg., 100C. would need to be held for seconds, while 70C. would need to be held for 30 minutes, while a lower temperature, e.g., 52° C. would need to be held for 12 hours. The exact time for determining the length of this heat step is taught by the formula present in the 40CFR part 503 regulation of 1993, incorporated herein by reference.

The sludge mixture as it cools from the heat contains a maximum of indigenous microflora given the specific processing temperature utilized and is therefor processed to maximize odor control and the soil-like properties of the sludge product.

In the preferred embodiment the output from the heat step enters a mechanical cooling device, e.g., a rotary drum. This cooling drum can have a flow of air containing 0.03% $CO_2$, which cools the sludge mixture and serves to carbonate the residual hydroxides present in the mixture. This process can be expedited by incorporating into the cooler a gas containing a higher concentration of $CO_2$ than that found in the atmosphere, ie., 0.03% $CO_2$. This process produces a product which then will be able to be beneficially utilized in land application programs for agriculture, soil supplement programs and synthetic soil production.

This sequence of the present invention optimizes the indigenous microflora's subsequent catabolism of unstable organics and further reduces and controls the long term odor of the treated sludge mixture so that the product odor develops a soil-like intensity and prevents the regrowth of pathogenic microorganisms and maintains stability in the sludge mixture.

Additionally the heat pasteurization method:
a) requires lower calcium oxide levels than an alkaline pasteurization methodology as taught by U.S. Pat. No. 4,902,431;
b) uses the residual heat accompanying the drying step to achieve the desired temperature of the heat step;
c) avoids heating the sludge mixture twice as would be accomplished by the traditional alkaline process with the mechanical drying placed after the heat step;
d) enables economic savings by the utilization of lower amounts of total heat producing energy in the sequence;
e) causes lower volatile organic carbon emissions to occur in the processing;
f) improves the dryer feed size and granularity which is important in the efficiency of dryer operations due to the lack of compression in the traditional heat sequence;
g) allows more rapid $CO_2$ carbonation of the sludge mixture;
h) allows achievement of physiological pH in the product more rapidly than the prior alkaline stabilization sludge treatment sequence.
i) has the desirable effect of significantly reducing the emission of ammonia nitrogen from the treated sludge product, and;
j) minimizes the exposure of the indigenous microflora to the process stresses of heat and ammonia to only that necessary for pathogen control in the pasteurization process.

Prior sludge processing art that incorporate the heat pasteurization step prior to the agitation and drying or aeration and drying cause an unnecessary exposure of the indigenous beneficial microorganisms to the heat of the drying process and may further reduce to undesirable levels the populations and numbers of surviving indigenous beneficial nonpathogenic microflora.

The resultant bioactive product of this invention is useful as a soil substitute or as a fertilizer. A key objective of this invention is to enhance soil-like physical characteristics of the treated product by improving granulation and microbial content.

The present invention requires that an adsorbent material be mixed into the sludge, i.e., using a material comprised of cement kiln dust, lime kiln dust, gypsum, fluidized bed ash, lime injected multistage burner ash, dry sulfur scrubbing residue, slag fines, pulverized calcium carbonate, Class C or Class F fly ash, or a combination thereof, to bind odorant organics and inorganics from the sludge as well as raise the pH of the sludge commencing the production of pasteurization stresses in the sludge mixture of pH, ammonia production and heat.

The indigenous microflora surviving this optimized pasteurization process will be able to grow, over time after cooling has occurred, to a level which will effect the beneficiating activities of enhancing the carbonation of any residual hydroxides, the catabolism of unstable organics and the ability of this increased microflora population to prevent the regrowth of pathogenic microorganisms. These microflora should be within in the range of about $10^3$ to $10^7$ immediately after the heat pulse. These surviving microflora upon maturation subsequently should preferably multiply to achieve levels of between $10^7$ and $10^{10}$ aerobic bacteria in the mature stable product. The stable product would be expected to contain about $10^4$ to $10^7$ fungi per gram soil solids. If these levels are not achieved then soil-like bacteria and fungi can be added to the sludge mixture. These can be provided by adding directly to the sludge mixture an amount of agricultural soil which would result in microbial populations at the above levels. Secondly, these microbial levels are to be selected from a list representing the indigenous bacterial and fungal microflora of agricultural soils which could be produced in controlled culture and subsequently added. Thirdly, the bacteria added to the sludge mixture may include members of the actinomycete class of bacteria. The final resultant stabilized sludge product of this invention should contain greater than 50% solids and optimally allowed to mature for a minimum of 1 day prior to utilization, is granular, has a soil-like odor, and has a microbial population that will facilitate odor control, long term stability, prevention of pathogen regrowth and increased fertility value.

EXAMPLE

A dewatered wastewater sludge from a medium sized municipality was treated by a process comprised of the steps of treating and stabilizing sludges so that it achieves the U.S. Environmental Protection Agency's Class A standard for pathogen reduction, by mixing the sludge with an adsorbent alkaline material comprised of a mix of cement kiln dust and Class C fly ash to effect odor reduction, accelerate the achievement of granularity, and consequently adjusting the pH of the sludge mixture to above pH 12.0, and then, agitating and drying the sludge mixture by a rotary drum dryer, and then subjecting the sludge mixture to a heat pulse of 52° C. for 12 hours. The sludge mixture after the initial mixing was immediately placed in a mechanical rotary drum dryer operating around a horizontal axis, at an input solids levels of about 45% and taken out of the dryer at 60% solids. The gas-fired dryer, designed by the Duske Company of Hales Corners, Wis., and manufactured by the Cementech, Inc. of Indianola, Ind., moved the product through the dryer in a continuous manner from the inlet to the outlet by means of an air stream created by the forced hot air from the gas fired mechanism instead of paddles or blades. The burner was operated at 840° F. and the product exit temperature from the dryer was 178° F. The product as it exited the dryer was then placed about 5 feet deep into a heat pulse bin which had a moving floor timed to exit the material after being held for 12 hours. The sludge mixture was then stockpiled in piles of approximately 4 feet in height until cooled to ambient temperature levels. The treated sludge product was then tested to verify compliance with the Class A USEPA regulations and then used in agriculture and the remainder then stockpiled indefinitely for future use. The longer the product is left to mature the more it will resemble soil as the microbial catabolism mineralizes the available sludge organics and improves the product odor to be more soil-like.

Tests were also conducted varying the input burner air temperature in the rotary drum dryer over the range of 400° F. to 1500° F. with an analysis of the product of this invention showing basically very similar and satisfying results in that the product achieve the Class A pathogen reduction levels and showed a significant surviving indigenous microflora.

I claim:

1. A method of treating sludge to provide a stable product for use as a beneficial soil or fertilizer for agricultural lands which includes the steps of:
   (a) mixing sludge with at least one alkaline material in an amount sufficient to raise pH of the mixture to a level of at least 12 and to increase percent solids in the mixture to at least 40% by weight, and such that odorant sludge organics and inorganics are bound to adsorbent particles of the alkaline material,
   (b) aerating and drying the mixture by agitation and heating to stabilize the mixture and increase the percent solids to at least 50% by weight, and
   (c) pasteurizing the dried mixture at a temperature at or above 52° C. by application of heat resulting from an exothermic reaction of the alkaline material with water in the sludge, wherein said step (b) is carried out in a mechanical means selected from the group consisting of a drum dryer, a pelletizer, and a fluidized bed apparatus, and wherein the heat applied for drying in said step (b) reduces the amount of additional heat required for pasteurization in said step (c) thereby reducing the amount of alkaline material needed for said exothermic reaction.

2. The method set forth in claim 1 wherein the sludge is selected from the group consisting of raw primary wastewater sludge, digested wastewater sludge, secondary wastewater sludge, combined wastewater sludge, a product of an industrial process that includes microbial cells or components, bioorganic sludges, organic sludges, and mixtures thereof.

3. The method set forth in claim 1 wherein following said step (c) the product is maintained for a time sufficient to allow the microbial population of the sludge to establish and to commence catabolism of the organics present in the mixture, to continue the odor reduction initially begun by the addition of the adsorptive material, to prevent regrowth of pathogenic organisms, and to continue to carbonate any residual calcium hydroxide or calcium oxide components to form a stable product.

4. The method set forth in claim 1 wherein the mixture is mechanically cooled and aerated following said step (c).

5. The method according to claim 1 comprising the additional step of product carbonation of the pasteurized mixture by air which contains $CO_2$ or by a gas containing a concentration of $CO_2$ greater than that of air.

6. The method according to claim 1 comprising the additional step (d) of: controlling microbial content of the mixture by adding a sufficient quantity of agricultural soil containing an indigenous microflora within the range of about $10^5$ to $10^{10}$ aerobic bacteria and about $10^4$ to $10^7$ fungi per gram soil solids.

7. The method according to claim 6 wherein the microflora added to the sludge mixture includes bacteria produced in controlled cultures and are selected from indigenous bacterial and fungal microflora of agricultural soils.

8. The method according to claim 7 wherein the microflora added includes members of the actinomycete class of bacteria.

9. The method according to claim 6 wherein the microflora added to the sludge mixture are obtained from a stored sludge product resulting from the method.

10. The method according to claim 1 wherein said step (c) includes the step of heating the mixture to a temperature within the range of 52° C. to 100° C.

* * * * *